May 24, 1932.  R. J. STOKES  1,860,269
POWER BELT
Filed Sept. 30, 1930
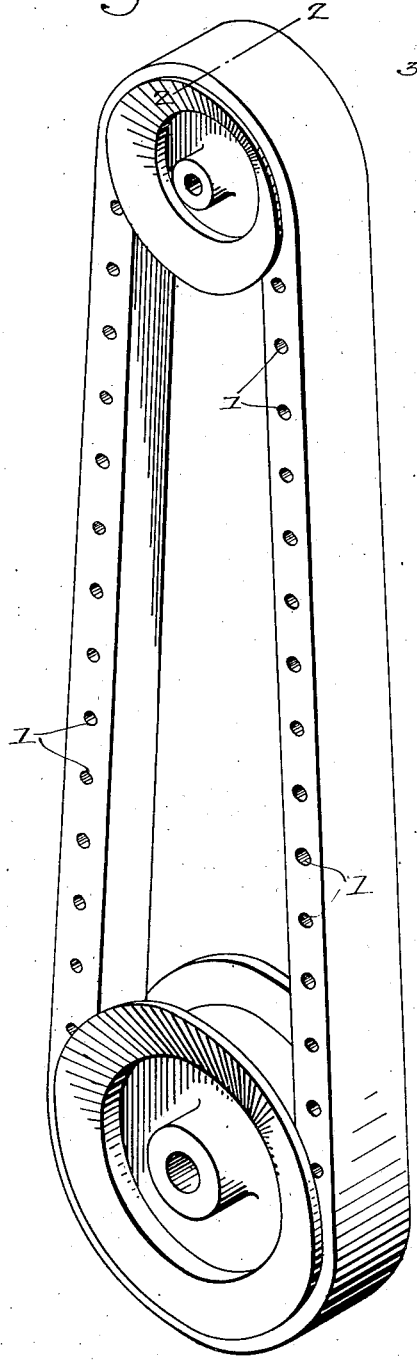
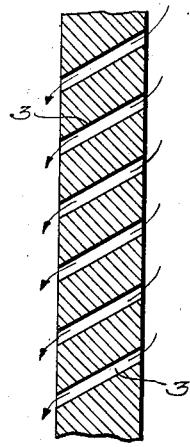
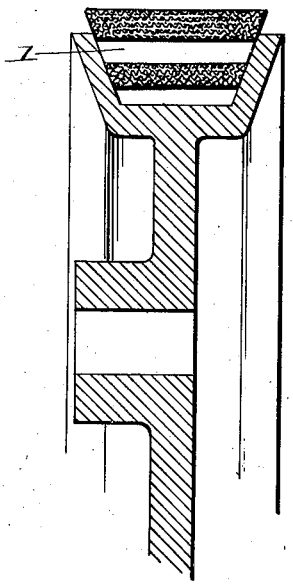
Inventor
Robert J. Stokes
by his Attorneys
Howson & Howson Patented May 24, 1932

1,860,269

UNITED STATES PATENT OFFICE

ROBERT J. STOKES, OF PRINCETON TOWNSHIP, MERCER COUNTY, NEW JERSEY, ASSIGNOR TO THERMOID RUBBER COMPANY, OF TRENTON, NEW JERSEY, A CORPORATION OF NEW JERSEY

POWER BELT

Application filed September 30, 1930. Serial No. 485,511.

This invention relates to improvements in power belts, and has an application of particular value to belts of the V type, commonly used as the fan belts of automobiles.

This type of belting by reason of its relatively great thickness frequently lacks the required flexibility in the plane in which it is designed to operate. Belts of undue stiffness have a tendency to slip and must be applied to the pulleys under considerable tension in order to provide an adequate bearing surface between the pulleys and the belt, this tension putting an unnecessary strain upon the shaft or pulley journals.

It is the principal object of this invention to provide a belt of the stated character that shall possess the degree of flexibility required for maximum operative efficiency.

A belt made in accordance with my invention will closely embrace the pulleys and will maintain non-slipping contact with the pulleys without undue tensioning. Flexibility is obtained, however, without sacrifice of strength required in this type of belt.

Another object of the invention is to provide a belt of the stated character which shall be generally more durable than the corresponding belts of the prior practice, and to this end, a specific object of the invention is to provide a belt that will operate at relatively low temperatures, thereby eliminating destructive heat conditions to which these belts as made in accordance with the prior practice have been subject.

A still further object of the invention is to provide a belt that will be self-ventilating.

In the attached drawings:

Figure 1 is a view in perspective of a belt made in accordance with my invention;

Fig. 2 is a section on the line 2—2, Fig. 1, and

Fig. 3 is a fragmentary longitudinal sectional view illustrating a modification within the scope of the invention.

With reference to the drawings, the embodiment of my invention therein illustrated for descriptive purposes comprises a power belt of the well known V type which may be made of rubber or rubberized fabric, leather or any of the materials commonly used in the industry, this belt, as best shown in Fig. 2, being of relatively great thickness by reason of the requirement for extended side surfaces to frictionally engage the pulley.

As previously set forth, this type of belt has a tendency to undue stiffness which tends to prevent the belt from conforming readily to the shape of the pulley and requires that the belt be placed under considerable tension to bring it into effective engagement with the pulley surfaces. This tendency to stiffness is particularly noticeable in belts of fabric materials and those including combinations of rubber and fabric.

I have discovered that by forming the belt with a series of transverse apertures 1 or perforations extending from one side surface of the belt to the other and arranged in spaced relation preferably the full length of the belt, not only is the undesirable stiffness eliminated and a belt of desirable flexibility and high efficiency obtained, but an actually superior gripping action between the sides of the belt and the pulley is effected by reason of a suction action through the aforesaid perforations. A belt made in accordance with my invention has a tendency to adhere closely to the pulley even when applied under little or no tension, thus making possible a relative looseness in the belt without loss in efficiency and with a consequent relief of the pulley or shaft journals from the strains imposed thereon where a highly tensioned belt is employed.

I have further discovered that a belt made as described above possesses a durability exceeding that of a solid unperforated belt of the same composition. This I attribute to the fact that the perforations afford a ventilating effect which reduces the operating temperature of the belt and prevents the development of excessive temperatures having a deleterious effect upon the belt material. This is particularly noticeable in belts employing rubber or rubber compositions wherein the high temperatures developed during operation have a marked tendency to adversely affect the said composition. The apertures provided in my belt materially increase the effective ventilated surface of the belt and afford an article of exceptional durability.

The self-ventilating effect may be enhanced by the arrangement of apertures illustrated in Fig. 3 wherein the said apertures 3 are inclined longitudinally of the belt, one end of each of the apertures thereby leading the other, and there being a resultant tendency to create a movement of air through the said apertures as indicated by the arrows in the drawings.

It will be understood that the invention is not limited to the particular form of belt illustrated in the drawings, and that it is applicable to belts of any composition or construction.

I claim:

1. A power belt having a series of spaced apertures inclined to the direction of movement of said belt.

2. A power belt of the V type having a series of spaced transversely extending apertures inclined to the longitudinal axis of the belt.

ROBERT J. STOKES.